US010582725B2

(12) United States Patent
Li et al.

(10) Patent No.: US 10,582,725 B2
(45) Date of Patent: *Mar. 10, 2020

(54) BATTERY ASSEMBLY AND ELECTRONIC CIGARETTE HAVING SAME

(71) Applicant: Shenzhen First Union Technology Co., Ltd., Shenzhen, Guangdong Province (CN)

(72) Inventors: Yonghai Li, Shenzhen (CN); Zhongli Xu, Shenzhen (CN)

(73) Assignee: SHENZHEN FIRST UNION TECHNOLOGY CO., LTD., Shenzhen, Guangdong Province (CN)

( * ) Notice: Subject to any disclaimer, the term of this patent is extended or adjusted under 35 U.S.C. 154(b) by 953 days.

This patent is subject to a terminal disclaimer.

(21) Appl. No.: 14/340,555

(22) Filed: Jul. 24, 2014

(65) Prior Publication Data
US 2015/0083145 A1 Mar. 26, 2015

(30) Foreign Application Priority Data
Sep. 24, 2013 (CN) .................. 2013 2 0588244 U

(51) Int. Cl.
*A24F 47/00* (2006.01)
*H01M 2/10* (2006.01)

(52) U.S. Cl.
CPC .......... *A24F 47/008* (2013.01); *A24F 47/002* (2013.01); *H01M 2/1055* (2013.01)

(58) Field of Classification Search
CPC .............................. A24F 47/00; A24F 47/008
See application file for complete search history.

(56) References Cited

U.S. PATENT DOCUMENTS

| 8,539,959 B1* | 9/2013 | Scatterday | A61M 15/06 131/194 |
| 2011/0304282 A1* | 12/2011 | Li | A24F 47/008 315/362 |
| 2013/0340779 A1* | 12/2013 | Liu | A24F 47/002 131/329 |
| 2014/0020696 A1* | 1/2014 | Liu | A24F 47/002 131/329 |
| 2016/0113325 A1* | 4/2016 | Liu | A24F 47/008 131/329 |

* cited by examiner

*Primary Examiner* — Alex B Efta
(74) *Attorney, Agent, or Firm* — Cheng-Ju Chiang

(57) ABSTRACT

The present disclosure relates to an exemplary battery assembly for an electronic cigarette. The battery assembly includes a housing, a battery received in the housing, an AAES electrically connected with the battery, an end cover fixed at one end of the housing, and a holder. The end cover defines a receiving space. The holder includes a bottom wall, a side wall, and a plurality of spaced protruding stages. The side wall extends from a first surface of the bottom wall. The protruding stages are formed on an opposite second surface of the bottom wall. The side wall and the bottom wall cooperatively define an accommodating space. The AAES is received in the accommodating space in such a manner that the protruding stages face the battery. The holder is received in the receiving space.

9 Claims, 5 Drawing Sheets

BATTERY ASSEMBLY AND ELECTRONIC CIGARETTE HAVING SAME

TECHNICAL FIELD

The present invention relates to electronic cigarettes, and particularly to a battery assembly and an electronic cigarette using same.

BACKGROUND ART

A typical electronic cigarette includes an atomizer and a battery assembly for powering the atomizer. An air actuating electronic switch (AAES) are widely used in the battery assembly to activate the electronic cigarette when the user sucks the electronic cigarette. Generally, the AAES is directly assembled into a housing receiving a battery, then an end cover is coupled to an end of the housing, the AAES is fixed by the end cover and the battery. Because the AAES may be pressed directly by the end cover and the battery, welding points of the AAES may become loosened or damaged, and accordingly, the AAES may be damaged.

What is needed, therefore, is a battery assembly and an electronic cigarette using same, which can overcome the above shortcomings.

SUMMARY

The present disclosure relates to an exemplary battery assembly for an electronic cigarette. The battery assembly includes a housing, a battery received in the housing, an AAES electrically connected with the battery, an end cover fixed at one end of the housing, and a holder. The end cover defines a receiving space. The holder includes a bottom wall, a side wall, and a plurality of spaced protruding stages. The side wall extends from a first surface of the bottom wall. The protruding stages are formed on an opposite second surface of the bottom wall. The side wall and the bottom wall cooperatively define an accommodating space. The AAES is received in the accommodating space in such a manner that the protruding stages face the battery. The holder is received in the receiving space.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below and with references to the drawings.

Figure 1:
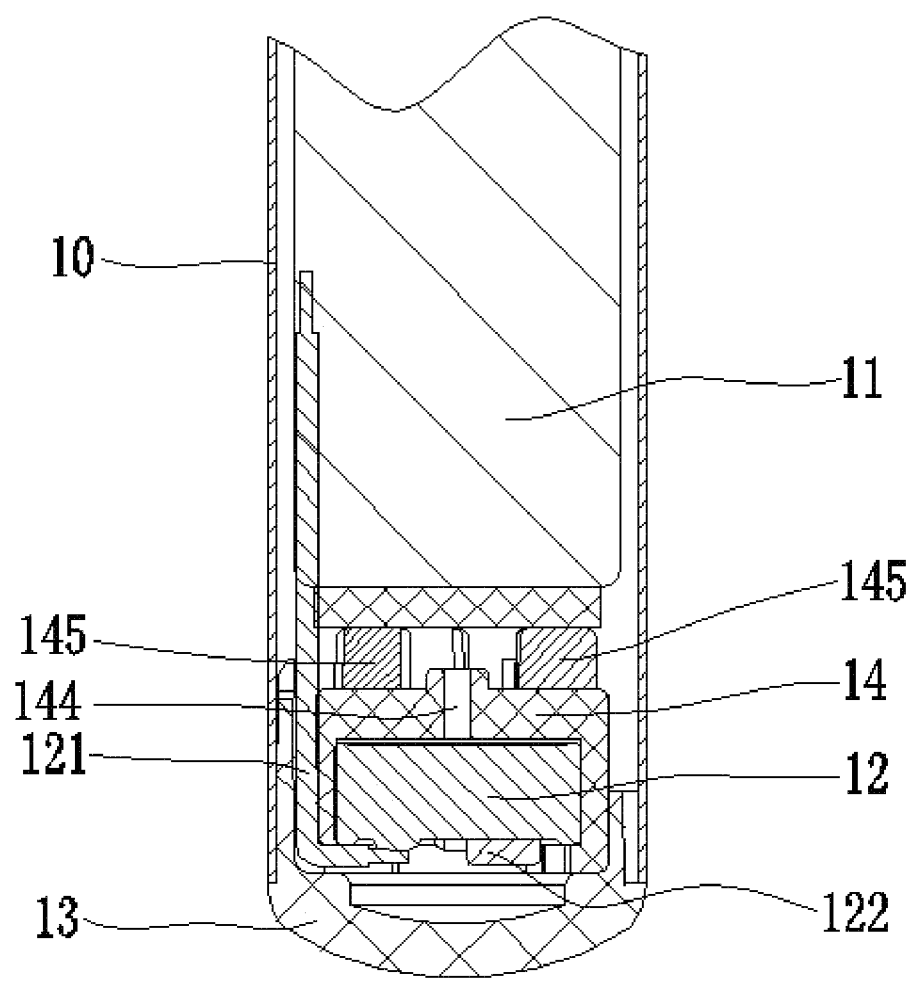
FIG. 1 is a cross-sectional view of a battery assembly according to a first embodiment.

Referring to FIG. 1, a battery assembly for an electronic cigarette, includes a housing 10, a battery 11, an air actuating electronic switch (AAES) 12, a holder 14, and an end cover 13. The battery 11 is received in the housing 10, the AAES 12 is electrically connected with the battery 11, the end cover 13 is fixed at one end of the housing 10, and the end cover 13 defines a receiving space 131 (referring to FIG. 4). In the present embodiment, the end cover 13 is connected with the housing 10 by interference fit.

Figure 2:
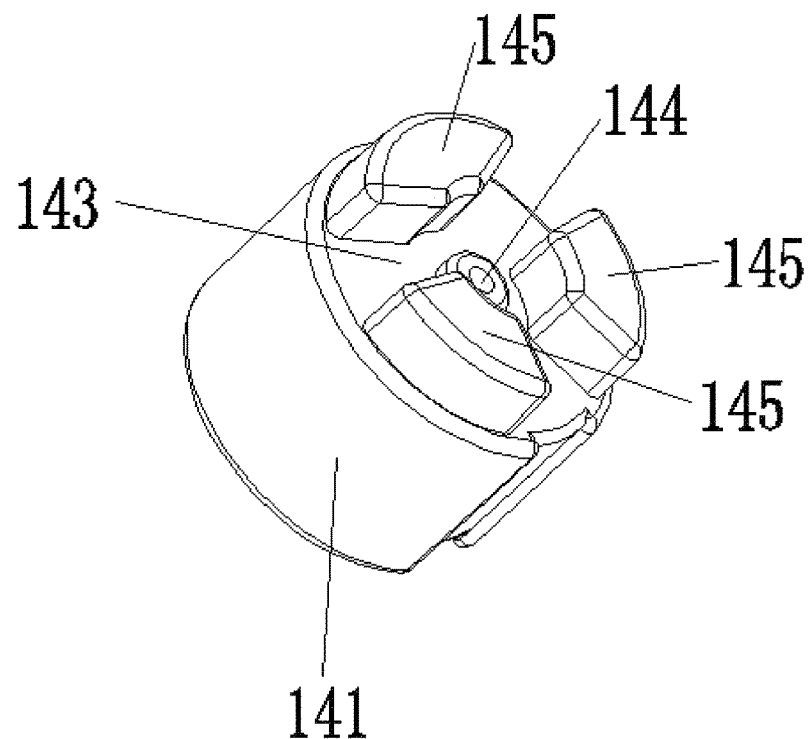
FIG. 2 is a perspective view of a holder of FIG. 1.
Figure 3:
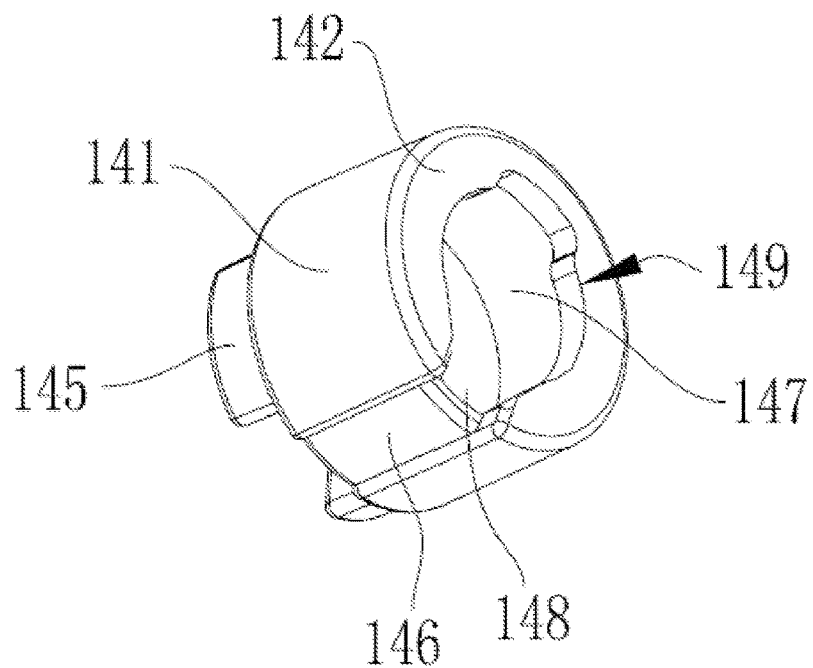
FIG. 3 is another perspective view of the holder of FIG. 1, viewed from another angle.

Referring to FIGS. 2-3, the holder 14 includes a side wall 141, a top wall 142, a bottom wall 143, a through hole 144, a plurality of protruding stages 145, a wire slot 146, an accommodating space 147, and a notch 148. The top wall 142 protrudes from the side wall 141 towards a central axis of the holder 14, and defines an opening 149. The bottom wall 143 is connected with the side wall 141. The through hole 144 is defined in the bottom wall 143. The protruding stages 145 surround the through hole 144. The accommodating space 147 is defined by the side wall 141 and the bottom wall 143. In the present embodiment, the quantity of the protruding stages 145 is three. The protruding stages 145 are configured for keeping the holder 14 spaced away from the battery 11 to form a hollow structure, facilitating the flow of air. The holder 14 is made of silica gel, has very good characteristic of buffering, and can provide a buffering when the battery 11 undergoes an external force.

Referring to FIG. 1 again, the AAES 12 includes wires 121 for connecting with the AAES 12 and the battery 11. The wires 121 are for powering the AAES 12 via the battery 11. The wire slot 146 is configured for guiding the wires 121, and is defined in the side wall 141 of the holder 14. The notch 148 defined in the top wall 142 of the holder 14 communicates with the wire slot 146 (as seen in FIG. 3), thus improving the airtightness of the battery assembly, thereby enhancing the sensitivity and reliability of the AAES 12.

Figure 4:
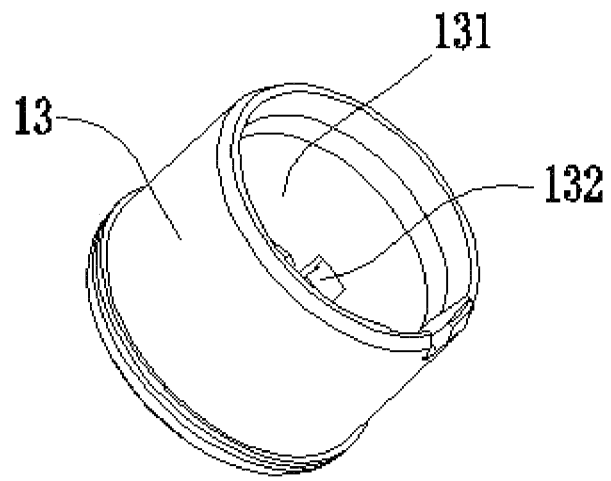
FIG. 4 is a perspective view of an end cover of FIG. 1.

Referring to FIG. 4, the receiving space 131 of the end cover 13 is configured for receiving the holder 14 and the AAES 12. The end cover 13 further defines an air inlet 132 for taking in air.

Figure 5:
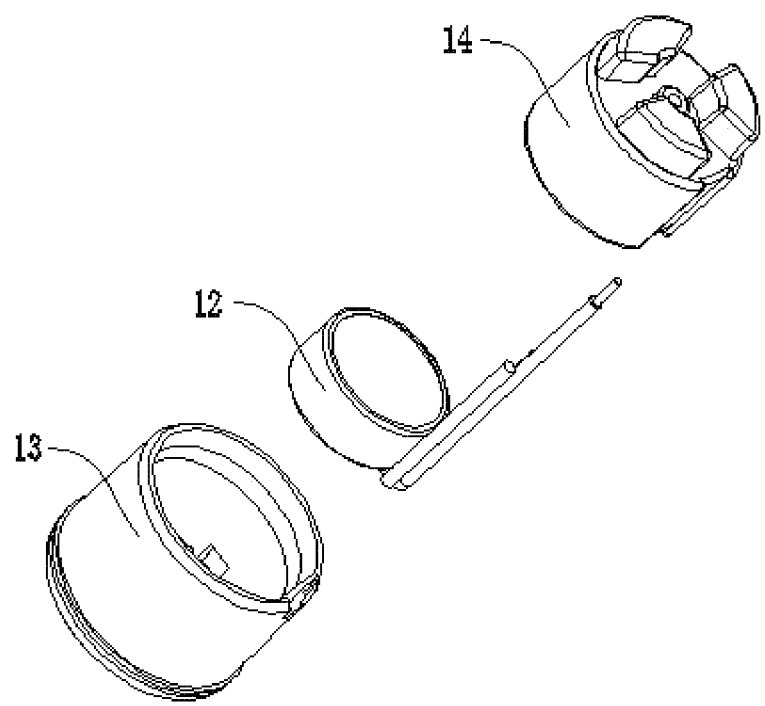
FIG. 5 is a perspective view showing the end cover, an AAES, and the holder of FIG. 1.
Figure 6:
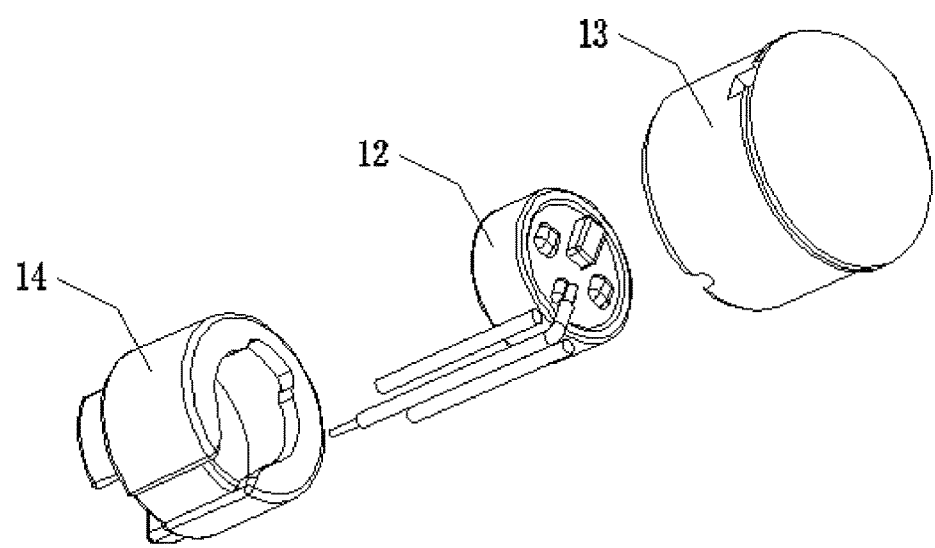
FIG. 6 is another perspective view showing the end cover, an AAES, and the holder of FIG. 1, viewed from another angle.

Referring to FIGS. 5-6, in assembly, the AAES 12 is first assembled in the holder 14 via the opening 149 of the top wall 142 to form an integral part. Then the integral part is installed into the receiving space 131. After the assembly is finished, the top wall 142 of the holder 14 faces the bottom of the receiving space 131 of the end cover 13, and the protruding stages 145 on the bottom wall 143 of the holder 14 contact the battery 11.

The battery assembly further includes an LED 122 (referring to FIG. 1) mounted on the AAES 12. The LED 122 is for indicating the working state of the battery 11. Preferably, the end cover 13 is made of light-permeable material, so that the working state of the LED 122 can be seen through the end cover 13.

Figure 7:
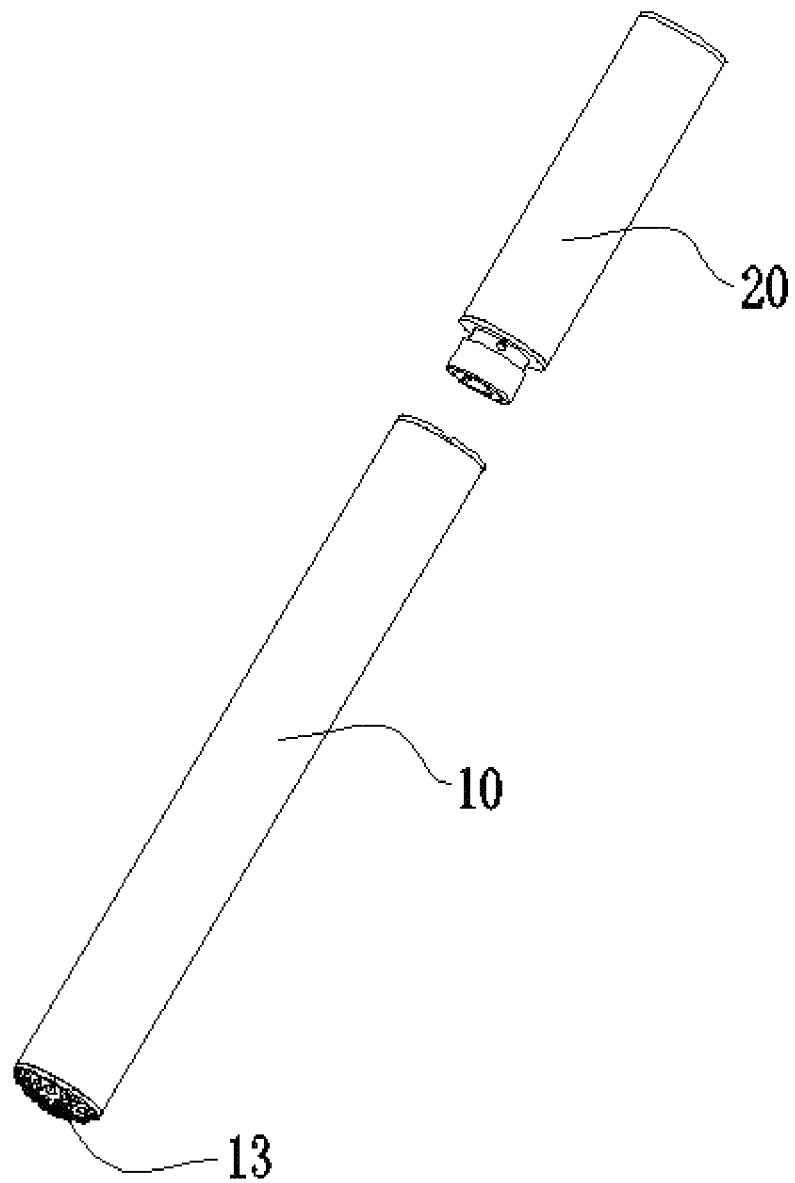
FIG. 7 is a perspective view of an electronic cigarette according to a second embodiment.

Referring to FIG. 7, an electronic cigarette according to a second embodiment includes an atomizer 20 and a battery assembly. The atomizer 20 is connected with the battery assembly threadedly. The battery assembly is the one as described in the first embodiment.

Because the AAES 12 and the holder 14 are assembled to form the integral part, and are then received in the end cover 13, the space occupied by the AAES 12 and the holder 14 is reduced. A volume of the battery 11 can be increased on the condition that a size of the housing 10 is fixed, thus increasing service time of the battery 11. Meanwhile, the holder 14 effectively protects the AAES 12, wires 121, and prevents the AAES 12 and the wires 121 from damaging when the battery 11 undergoes an external force. Accordingly, the performance of the battery assembly is improved, and the user experience of the electronic cigarette is also enhanced.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An electronic cigarette, comprising:
   an atomizer; and
   a battery assembly being configured for supplying power to the atomizer, the battery assembly comprising:
   a housing;
   a battery received in the housing;
   an end cover fixed at one end of the housing, the end cover defining a receiving space;
   a holder being received in the receiving space of the end cover, the holder comprising a bottom wall, a side wall, and a plurality of spaced protruding stages, the side wall extending from a first surface of the bottom wall to abut against a bottom of the receiving space of the end cover when the holder is received in the end cover, the protruding stages being formed on an opposite second surface of the bottom wall, the side wall and the bottom wall cooperatively defining an accommodating space, the protruding stages face the battery and contact the battery; and
   an air actuating electronic switch (AAES) electrically connected with the battery, the AAES being received in the accommodating space and abutting against the first surface of the bottom wall of the holder, the holder further received in the receiving space of the end cover after the AAES is received in the holder.

2. The electronic cigarette of claim 1, wherein the holder further comprises a top wall protruding from the side wall towards a central axis thereof, the top wall defines an opening at a center thereof.

3. The electronic cigarette of claim 2, wherein the AAES further comprises wires for connecting the AAES and the battery, the side wall of the holder defines a wire slot for accommodating the wires, and the top wall of the holder defines a notch communicating with the wire slot.

4. The electronic cigarette of claim 1, further comprising an LED (light emitting diode) mounted on the AAES.

5. The electronic cigarette of claim 1, wherein the end cover defines an air inlet.

6. The electronic cigarette of claim 1, wherein the end cover is made of light permeable material.

7. The electronic cigarette of claim 1, wherein the holder is made of silica gel.

8. The electronic cigarette of claim 1, wherein the end cover and the housing are engaged by interference fit.

9. The electronic cigarette of claim 1, wherein a total number of the plurality of protruding stages is three.

\* \* \* \* \*